United States Patent
Wei

(10) Patent No.: US 6,967,790 B2
(45) Date of Patent: Nov. 22, 2005

(54) DETACHABLE ZOOM LENS ASSEMBLY

(75) Inventor: David Wei, Taipei Hsien (TW)

(73) Assignee: E-Benk Tech Co., Ltd., Junghe (TW)

( * ) Notice: Subject to any disclaimer, the term of this patent is extended or adjusted under 35 U.S.C. 154(b) by 0 days.

(21) Appl. No.: 10/832,723

(22) Filed: Apr. 27, 2004

(65) Prior Publication Data

US 2005/0237625 A1 Oct. 27, 2005

(51) Int. Cl.$^7$ ............................................. G02B 15/14
(52) U.S. Cl. ..................... 359/704; 359/694; 396/544
(58) Field of Search ................ 359/703–704, 359/694, 819, 822–823, 827–830, 672–675, 359/676, 683; 396/72–75, 544

(56) References Cited

U.S. PATENT DOCUMENTS 5,745,298 A * 4/1998 Yahagi ....................... 359/683
6,424,473 B1 * 7/2002 Nakane et al. .............. 359/827

* cited by examiner

Primary Examiner—Jordan M. Schwartz
(74) Attorney, Agent, or Firm—Pai Patent & Trademark Law Firm; Chao-Chang David Pai

(57) ABSTRACT

A detachable zoom lens assembly includes a holder base, which has an insertion slot in the periphery and a light path through the two ends, a coupling structure for coupling the holder base to a photographic apparatus, a special effect unit detachably inserted into the insertion slot to hold a special effect lens in the light path, and a zoomer coupled to the front end of the holder base to hold a zoom lens for changing the focus of incident light.

3 Claims, 1 Drawing Sheet

DETACHABLE ZOOM LENS ASSEMBLY

BACKGROUND OF THE INVENTION

1. Field of the Invention

The present invention relates to a zoom lens assembly and, more particularly, to a detachable zoom lens assembly that is detachably connectable to a digital camera, camera mobile phone, or any of a variety of apparatus with photographic function.

2. Description of the Related Art

Following fast development of electronic technology, a variety of digital cameras, camera mobile phones, personal digital assistants with camera, and pocket computers with camera have been disclosed, and have appeared on the market. However, the cameras of mobile electronic apparatus do not provide a zoom function or special effect function.

BRIEF SUMMARY OF THE INVENTION

The present invention has been accomplished under the circumstances in view. One object of the present invention is to provide a detachable zoom lens assembly, which is detachably connectable to the lens assembly of a digital camera or the camera of a mobile electronic apparatus. Another object of the present invention is to provide a detachable zoom lens assembly, which can be controlled to change the focus and direction of incident light.

To achieve these and other objects of the present invention, the detachable zoom lens assembly comprises a holder base, the holder base comprising a first end, a second end, a light path extending through the first end and the second end, and an insertion slot in the periphery thereof between the first end and the second end; a special effect unit, the special effect unit comprising a special effect lens, and an open frame holding the special effect lens, the open frame being insertable into the insertion slot of the holder base to hold the special effect lens in the light path; and a zoomer, the zoomer comprising a casing coupled to the first end of the holder base, and a zoom lens mounted in the casing in axial alignment with the light path of the holder base.

DETAILED DESCRIPTION OF THE PREFERRED EMBODIMENT

Figure 1:
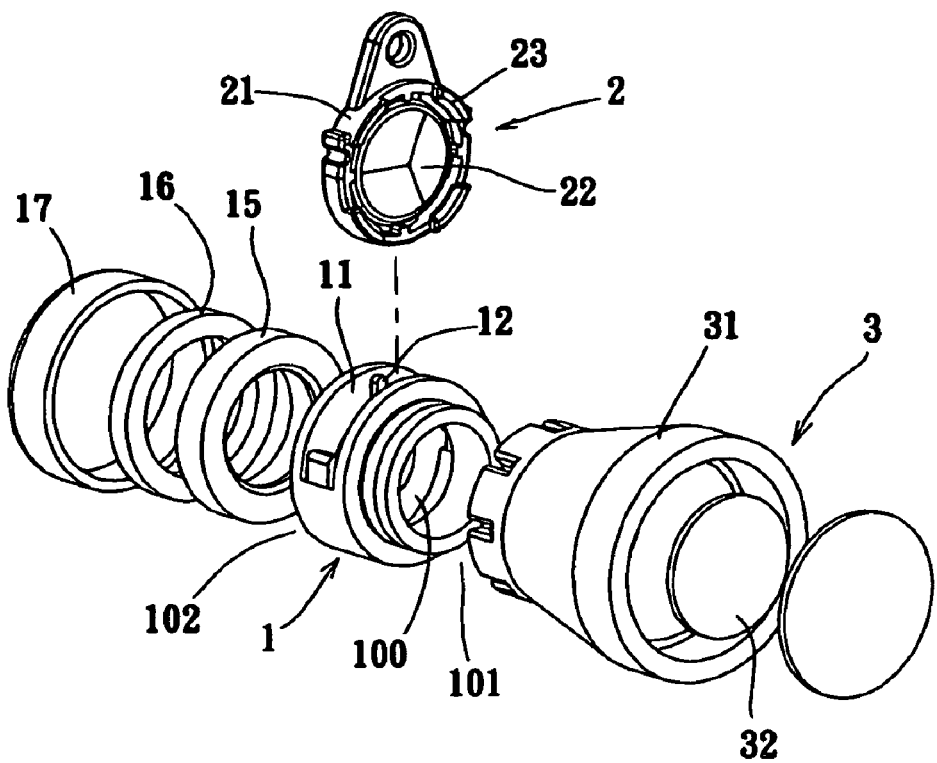
FIG. 1 is an exploded view of a detachable zoom lens assembly according to the present invention.
Figure 2:
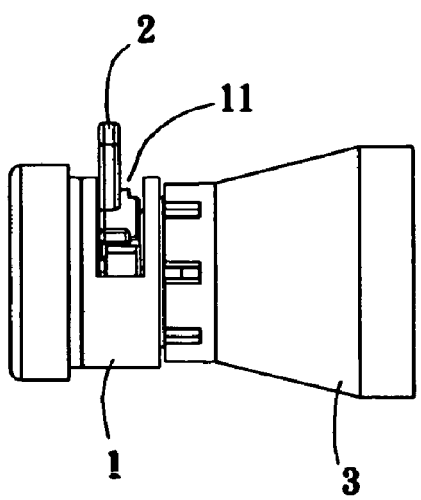
FIG. 2 is a side assembly view of the detachable zoom lens assembly according to the present invention.

Referring to FIGS. 1 and 2, a detachable zoom lens assembly is shown detachably connectable to a digital camera, camera mobile phone, or any of a variety of apparatus with photographic function, comprised of a holder base 1, a special effect unit 2, and a zoomer 3.

The holder base 1 has a first end 101 and a second end 102 opposite to the first end 101. The second end 102 is mounted with a ring 15, a cap 17 on the ring 15, and a silicon packing rubber 16 formed of silicon rubber and mounted in between the ring 15 and the cap 17. The ring 15, the silicon packing rubber 16 and the cap 17 form a coupling structure for securing the holder base 1 to a photographic apparatus or an apparatus having photographic function. The first end 101 and the second end 102 are in communication with each other, thereby providing a light path 100 for light to pass through to the image sensor means of the photographic apparatus or apparatus having photographic function. The holder base 1 further comprises an insertion slot 11 in the periphery and retaining portions 12 symmetrically disposed at two sides in the insertion slot 11.

The special effect unit 2 comprises an open frame 21 and a special effect lens 22 mounted in the open frame 21. The open frame 21 can be inserted into the insertion slot 11 of the holder base 1 through a plurality of retaining portions 23 corresponding to the retaining portions 12 in the insertion slot 11. After the open frame 21 is inserted into the insertion slot 11, the open frame 21 is biased through an angle to force the retaining portions 23 into engagement with the retaining portions 12 of the holder base 1, thus holding the special effect lens 22 in the light path 100 to deflect light and to further produce a special image effect. According to the present preferred embodiment, the special effect lens 22 is a prism capable of producing a symmetrical image effect like a kaleidoscope.

The zoomer 3 comprises a casing 31 and a zoom lens 32 mounted in the casing 31. The casing 31 is connectable to the first end 101 of the holder base 1 (by a screw joint) for changing the focus of incident light. Therefore, the zoom lens assembly can be used as a telescope.

When in use, the coupling structure of the detachable zoom lens assembly is coupled to the lens assembly of the digital camera or the like. When installed, the user can rotate the zoomer 3 to change the focus of incident light and/or rotate the holder base 1 with the ring 15 to change the symmetrical image effect produced by the special effect lens 22. Because the special effect unit 2 is detachable, different special effect units that produce different special image effects can be selectively used.

Although a particular embodiment of the invention has been described in detail for purposes of illustration, various modifications and enhancements may be made without departing from the spirit and scope of the invention.

The invention claimed is:

1. A detachable zoom lens assembly comprising:
   a holder base, said holder base comprising a first end, a second end, a light path extending through said first end and said second end, and an insertion slot in the periphery thereof between said first end and said second end;
   a special effect unit, said special effect unit comprising a special effect lens, and an open frame holding said special effect lens, said open frame being insertable into said insertion slot of said holder base to hold said special effect lens in said light path; and
   a zoomer, said zoomer comprising a casing coupled to the first end of said holder base, and a zoom lens mounted in said casing in axial alignment with said light path of said holder base.

2. The detachable zoom lens assembly as claimed in claim 1, wherein said special effect lens is a prism adapted to deflect light and to produce a special image effect.

3. The detachable zoom lens assembly as claimed in claim 1, further comprising a coupling structure adapted to couple said holder base to a photographic apparatus, said coupling structure comprising a ring, a cap capped on said ring, and a packing rubber mounted in between said ring and said cap.

* * * * *